US009540754B2

(12) United States Patent
Borlin et al.

(10) Patent No.: US 9,540,754 B2
(45) Date of Patent: *Jan. 10, 2017

(54) LAUNDRY TREATING APPLIANCE WITH INTEGRATED DYNAMIC BALANCER

(71) Applicant: Whirlpool Corporation, Benton Harbor, MI (US)

(72) Inventors: Christopher L. Borlin, Stevensville, MI (US); Mark R. Haslanger, South Bend, IN (US); George W. Malheiros, Saint Joseph, MI (US); Stephen D. Ostdiek, Saint Joseph, MI (US)

(73) Assignee: Whirlpool Corporation, Benton Harbor, MI (US)

( * ) Notice: Subject to any disclaimer, the term of this patent is extended or adjusted under 35 U.S.C. 154(b) by 147 days.

This patent is subject to a terminal disclaimer.

(21) Appl. No.: 14/273,885

(22) Filed: May 9, 2014

(65) Prior Publication Data
US 2015/0322613 A1 Nov. 12, 2015

(51) Int. Cl.
*D06F 37/24* (2006.01)
*D06F 37/22* (2006.01)
*B23P 19/04* (2006.01)

(52) U.S. Cl.
CPC ............ *D06F 37/245* (2013.01); *B23P 19/04* (2013.01); *D06F 37/225* (2013.01); *Y10T 29/4997* (2015.01); *Y10T 29/49828* (2015.01); *Y10T 29/49948* (2015.01)

(58) Field of Classification Search
None
See application file for complete search history.

(56) References Cited

U.S. PATENT DOCUMENTS

| 5,142,936 | A | 9/1992 | McGale |
| 5,850,748 | A | 12/1998 | Kim et al. |
| 5,916,274 | A | 6/1999 | Lee et al. |
| 6,442,782 | B1 | 9/2002 | Vande Haar |
| 7,743,633 | B2 | 6/2010 | Ryu et al. |
| 8,196,441 | B2 | 6/2012 | Hendrickson et al. |
| 8,388,695 | B2 | 3/2013 | Hendrickson et al. |
| 8,397,328 | B2 | 3/2013 | Hendrickson et al. |
| 8,397,544 | B2 | 3/2013 | Hendrickson |
| 8,438,881 | B2 | 5/2013 | Ihne et al. |

(Continued)

FOREIGN PATENT DOCUMENTS

| JP | 3162896 A | 6/1995 |
| KR | 20070115301 A | 12/2007 |

*Primary Examiner* — Michael Barr
*Assistant Examiner* — Cristi Tate-Sims

(57) ABSTRACT

A laundry treating appliance includes a rotatable drum for receiving a laundry load. The rotatable drum includes a cylindrical body with a cylindrical wall about a longitudinal axis, and a metal cover at one end thereof, the metal cover having an annular groove formed by a first wall, a second wall spaced from the first wall, a third wall extending between the first and second walls, and a fourth wall extending from the second wall. A metal adjoining piece having a first adjoining wall is coupled with the third wall and a second adjoining wall is coupled with the fourth wall, wherein a hollow annular raceway is defined by the second wall, the third wall, the first adjoining wall, and the second adjoining wall. A sound dampener is disposed adjacent at least one of the walls.

9 Claims, 9 Drawing Sheets

(56) References Cited

U.S. PATENT DOCUMENTS

| | | | |
|---|---|---|---|
| 2007/0277561 A1* | 12/2007 | Ryu | D06F 37/225 68/23.1 |
| 2009/0142538 A1* | 6/2009 | Sigler | B32B 15/08 428/76 |
| 2010/0000264 A1 | 1/2010 | Luckman et al. | |
| 2010/0000581 A1 | 1/2010 | Doyle et al. | |
| 2011/0041565 A1* | 2/2011 | Kim | D06F 31/00 68/139 |
| 2012/0103027 A1* | 5/2012 | Kim | D06F 37/225 68/140 |
| 2012/0144875 A1* | 6/2012 | Kim | D06F 37/206 68/13 R |

* cited by examiner

LAUNDRY TREATING APPLIANCE WITH INTEGRATED DYNAMIC BALANCER

BACKGROUND OF THE INVENTION

Laundry treating appliances, such as a washing machine, may implement cycles of operation in which a drum defining a treating chamber for receiving a laundry load is rotated at high speeds, such as a spin or water extraction phase. For example, to extract the water from the laundry load, the drum is typically spun at high speeds. If a sufficiently large enough load imbalance is present, the laundry treating appliance may experience undesirable vibrations and movements when the drum is rotated at high speeds during the spin phase.

SUMMARY OF THE INVENTION

In one aspect, the invention relates to a laundry treating appliance having an integrated dynamic balancer comprising a rotatable drum for receiving a laundry load wherein the rotatable drum includes a cylindrical body with a cylindrical wall about a longitudinal axis, and a metal cover at one end thereof, the metal cover having an annular groove formed by a first wall adjacent to the cylindrical wall, a second wall spaced from the first wall, a third wall extending between the first and second walls, and a fourth wall having at least a portion thereof extending from the second wall generally normal to the longitudinal axis. The balancer further comprises a metal adjoining piece having a first adjoining wall coupled with the third wall and a second adjoining wall coupled with the fourth wall, wherein a hollow annular raceway is defined by the second wall, the third wall, the first adjoining wall, and the second adjoining wall. A sound dampener may be disposed adjacent at least one of the walls and a mass disposed in the hollow annular raceway and movable therein.

BRIEF DESCRIPTION OF THE DRAWINGS IN THE DRAWINGS

Figure 5A:
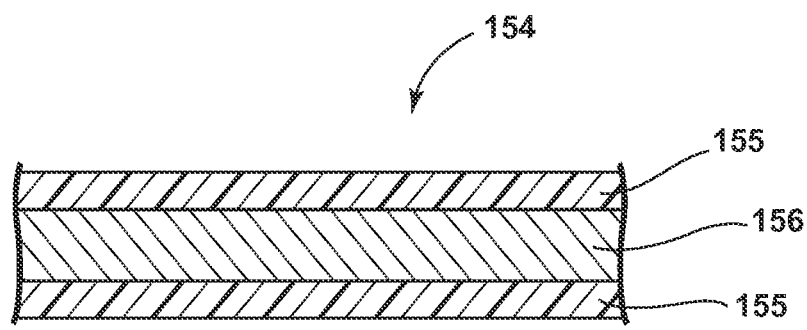
Figure 5B:
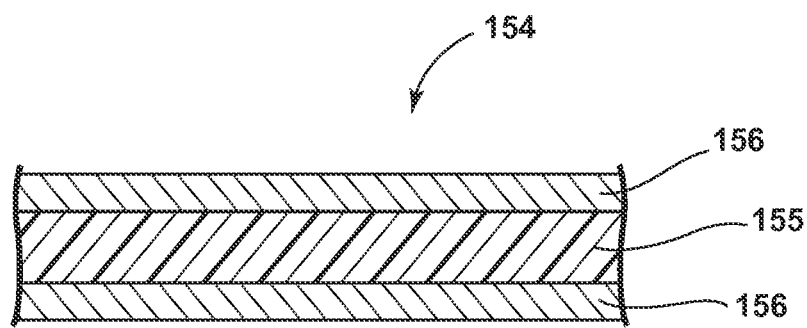

FIGS. 5A-B are cross sections of a laminated material for use in forming an integrated dynamic balancer in accordance with an embodiment of the invention.

Figure 6:
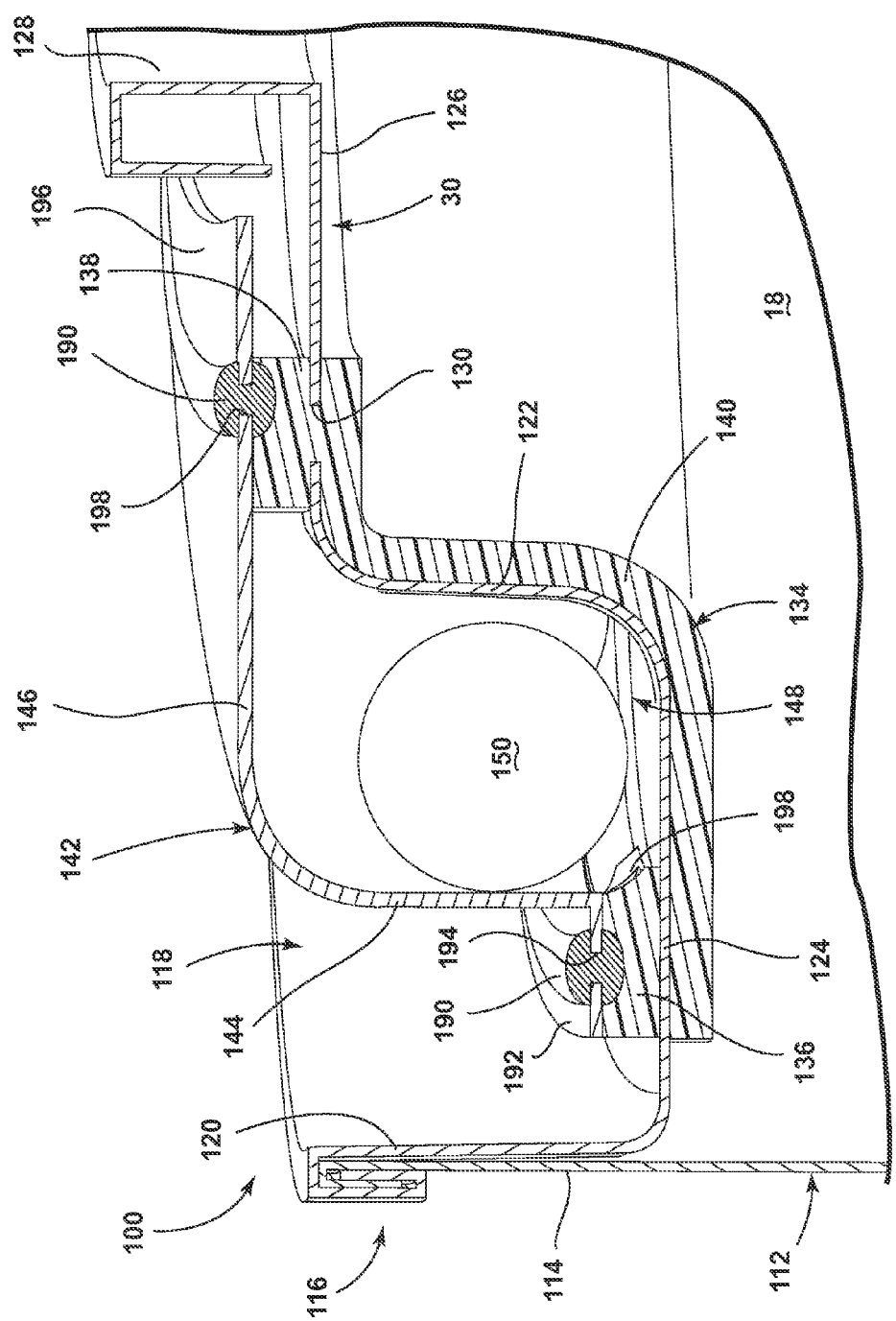

FIG. 6 is a cross section of an integrated dynamic balancer in accordance with another embodiment of the invention.

Figure 7:
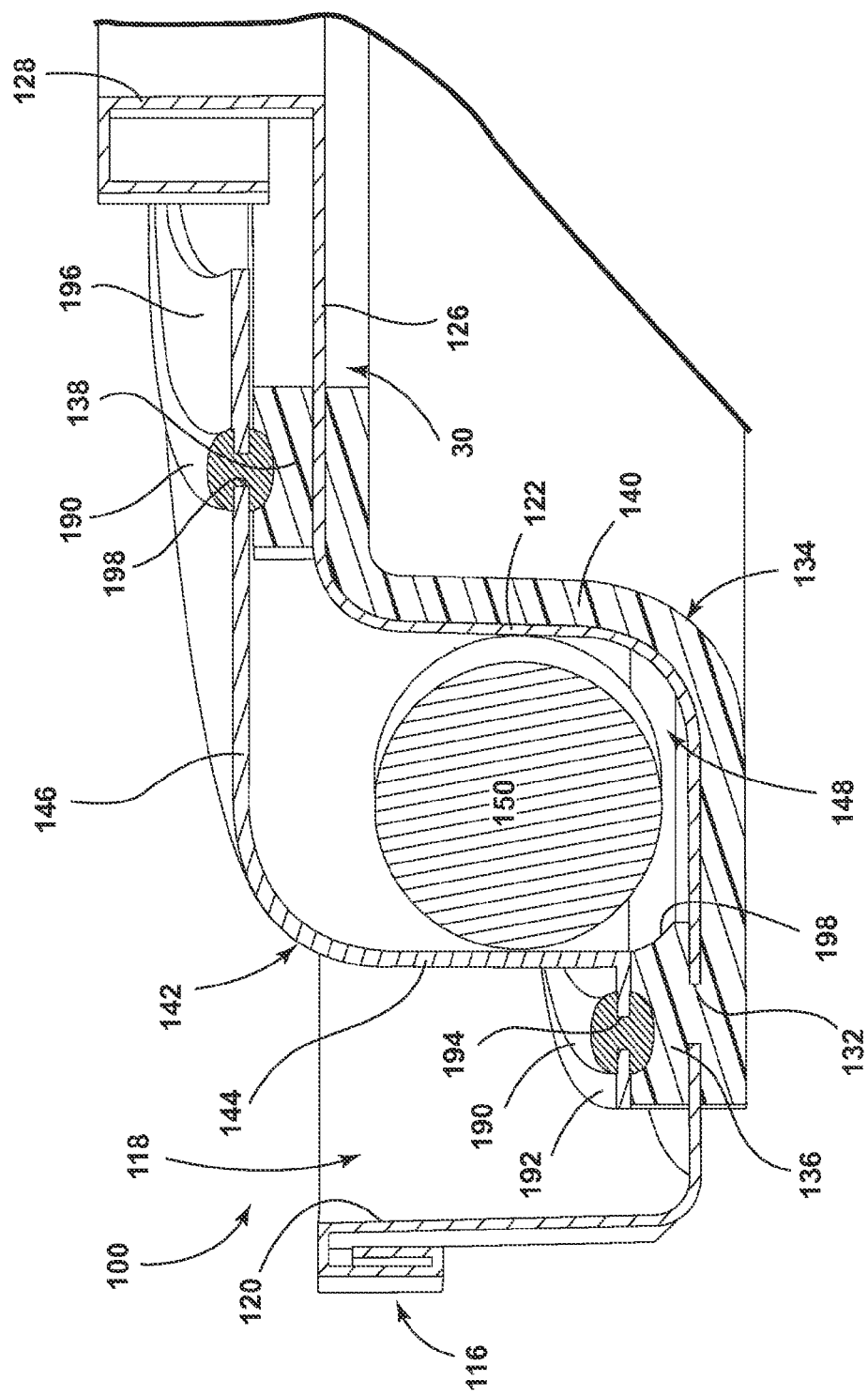

FIG. 7 is a cross section of the integrated dynamic balancer of FIG. 6 taken along a different radial location from that illustrated in FIG. 6.

Figure 8:
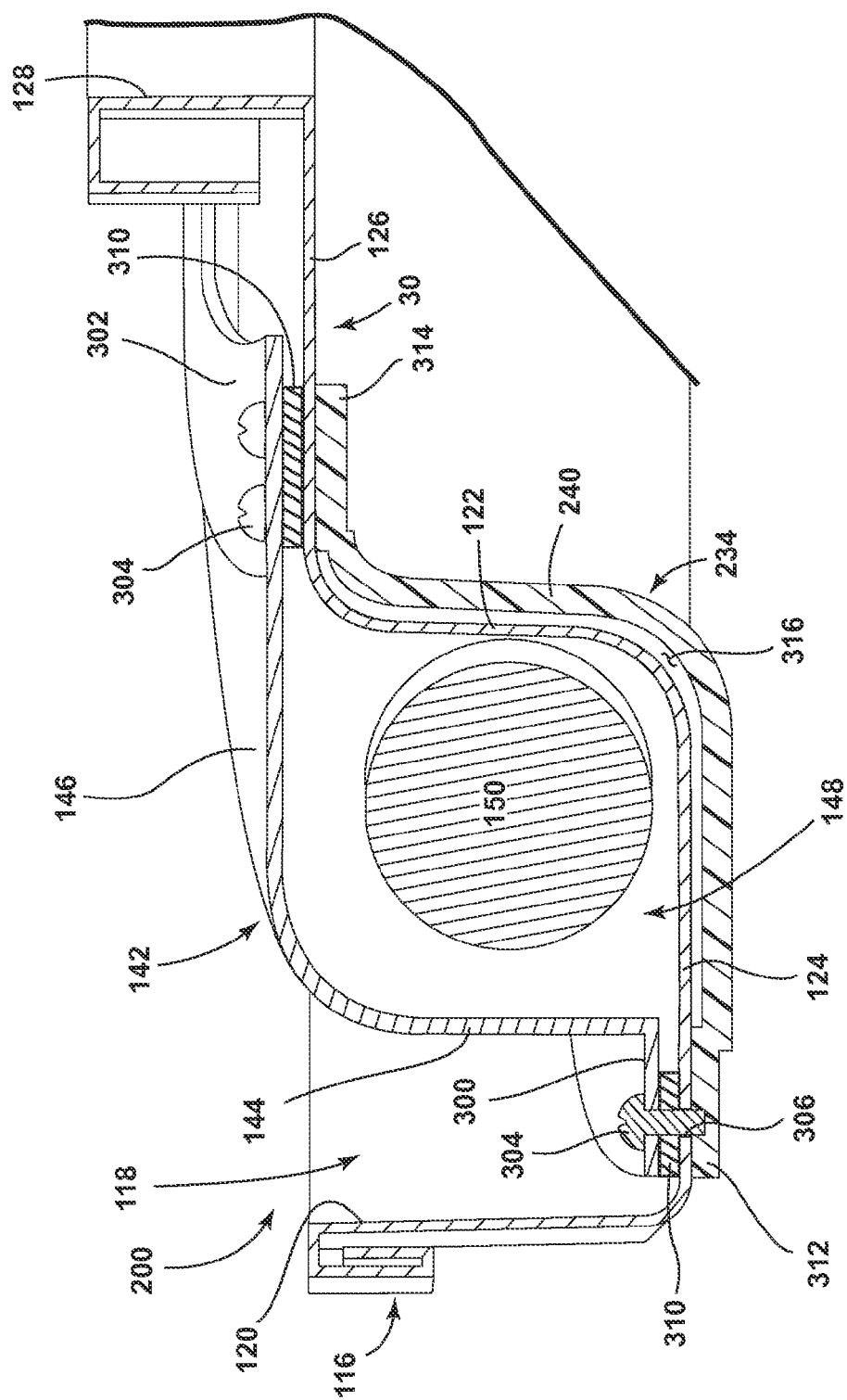

FIG. 8 is a cross section of an integrated dynamic balancer in accordance with another embodiment of the invention.

Figure 9:
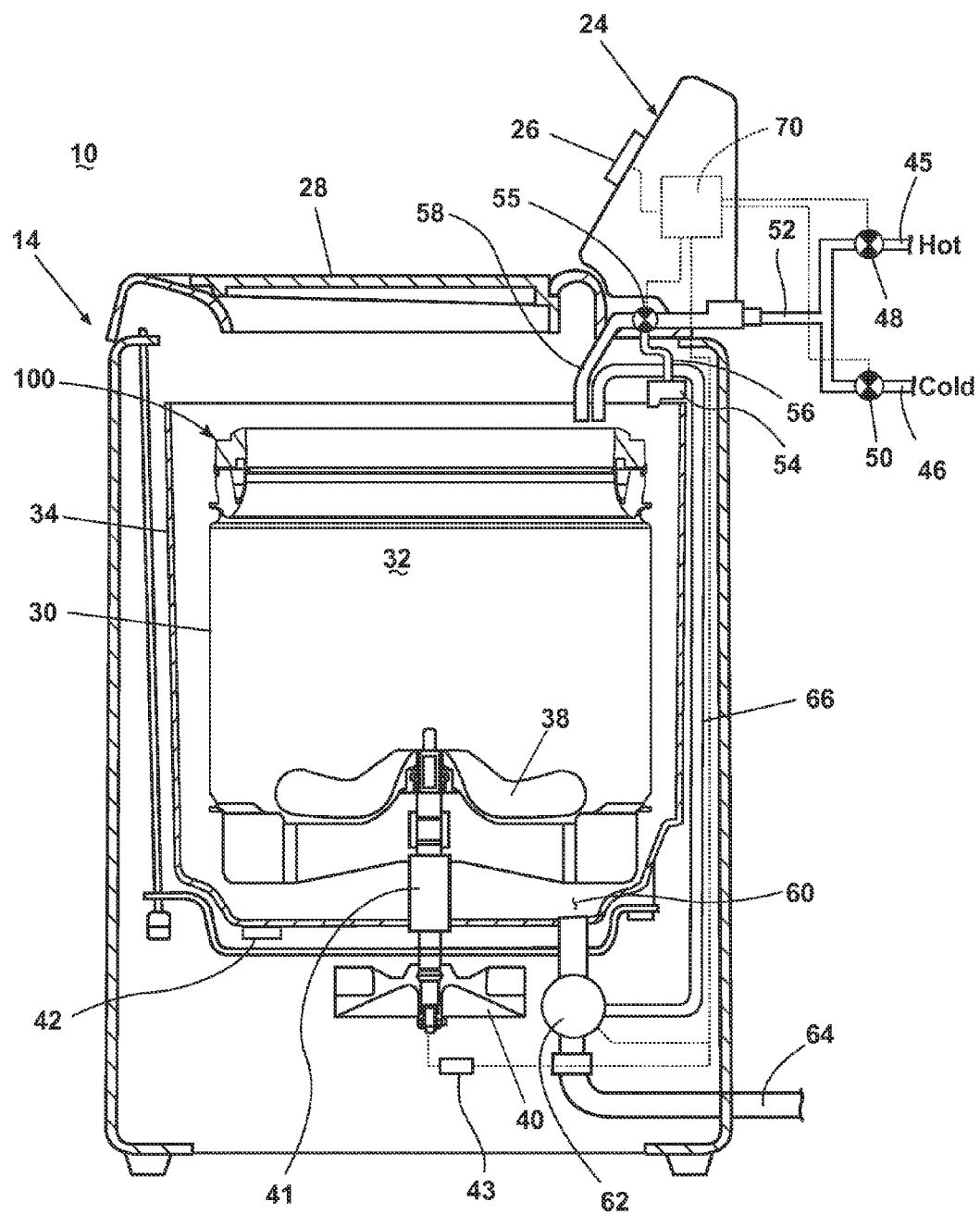

FIG. 9 is a schematic view of a laundry treating appliance in the form of a washing machine according to another embodiment of the invention.

DESCRIPTION OF EMBODIMENTS OF THE INVENTION

Figure 1:
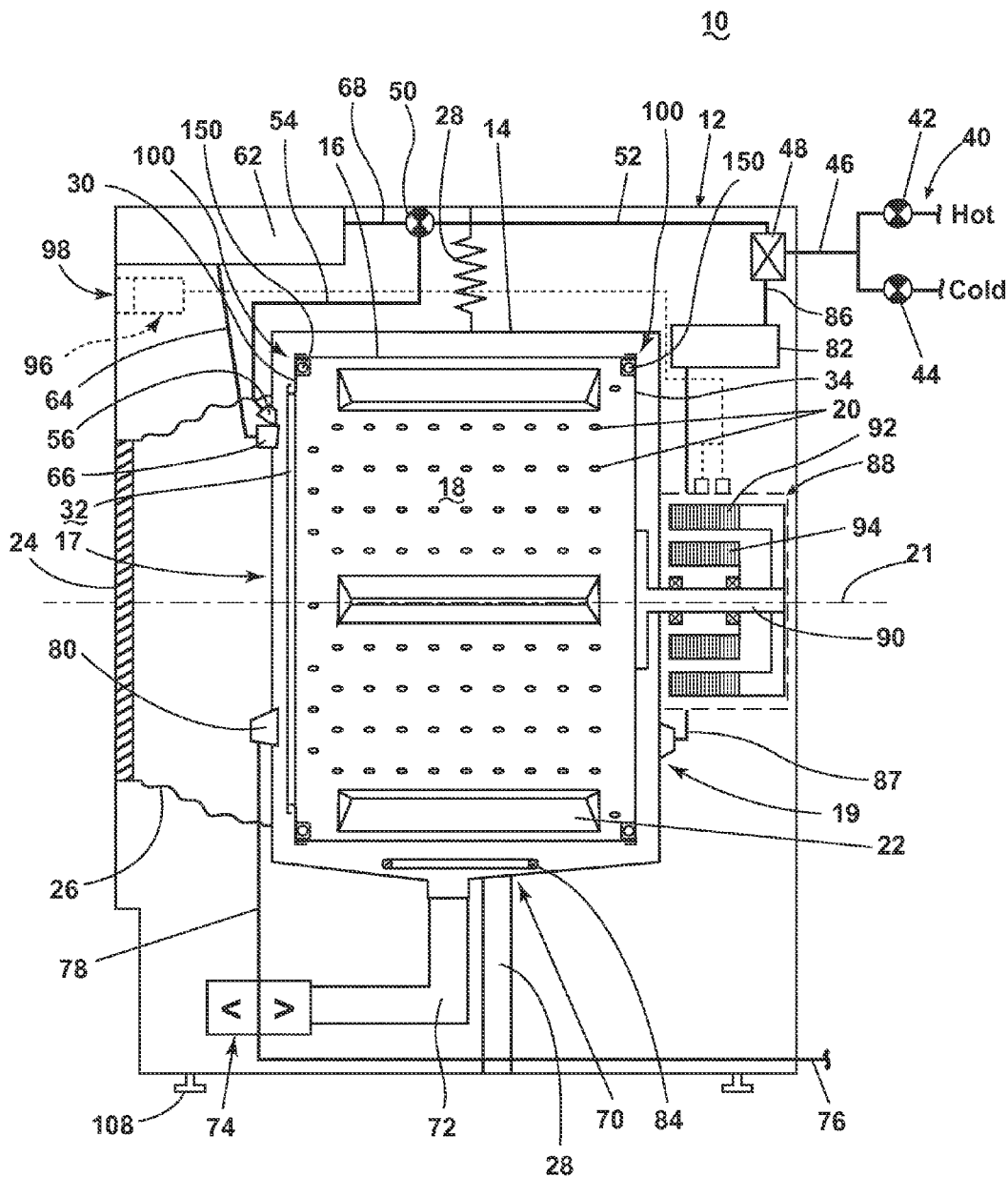
FIG. 1 is a schematic view of a laundry treating appliance in the form of a washing machine according to an embodiment of the invention.

FIG. 1 is a schematic view of a laundry treating appliance according to a first embodiment of the invention. The laundry treating appliance may be any appliance which performs a cycle of operation to clean or otherwise treat items placed therein, non-limiting examples of which include a horizontal or vertical axis clothes washer; a combination washing machine and dryer; a tumbling or stationary refreshing/revitalizing machine; an extractor; a non-aqueous washing apparatus; and a revitalizing machine.

The laundry treating appliance of FIG. 1 is illustrated as a washing machine 10, which may include a structural support system comprising a cabinet 12 which defines a housing within which a laundry holding system resides. The cabinet 12 may be a housing having a chassis and/or a frame, defining an interior that encloses components typically found in a conventional washing machine, such as motors, pumps, fluid lines, controls, sensors, transducers, and the like. Such components will not be described further herein except as necessary for a complete understanding of the invention.

The laundry holding system comprises a tub 14 supported within the cabinet 12 by a suitable suspension system and a rotatable drum 16 provided within the tub 14, the rotatable drum 16 defining at least a portion of a laundry treating chamber 18 having a longitudinal axis 21. The longitudinal axis 21 of the rotatable drum 16 is preferably coincident with a horizontal or non-vertical axis, though it is within the scope of the invention to accommodate a rotatable drum on a vertical axis of rotation. See, for example, an embodiment of a vertical axis washing machine according to the invention in FIG. 9. The rotatable drum 16 may include a plurality of perforations 20 such that liquid may flow between the tub 14 and the rotatable drum 16 through the perforations 20. A plurality of baffles 22 may be disposed on an inner surface of the rotatable drum 16 to lift the laundry load received in the treating chamber 18 while the rotatable drum 16 rotates. It is also within the scope of the invention for the laundry holding system to comprise only a tub with the tub defining the laundry treating chamber.

The rotatable drum 16 has a front side 17 and a rear side 19. The front side 17 includes a front cover 30 with an opening 32 therein to accommodate receiving laundry. The rear side 19 also has a rear cover 34. The covers 30, 34 thus form part of the drum 16.

The laundry holding system may further include a door 24 which may be movably mounted to the cabinet 12 to selectively close both the tub 14 and the drum 16. A bellows 26 may couple an open face of the tub 14 with the cabinet 12, with the door 24 sealing against the bellows 26 when the door 24 closes the tub 14.

The washing machine 10 may further include a suspension system 28 for dynamically suspending the laundry holding system within the structural support system.

The washing machine 10 may further include a liquid supply system for supplying water to the washing machine 10 for use in treating laundry during a cycle of operation. The liquid supply system may include a source of water, such as a household water supply 40, which may include separate valves 42 and 44 for controlling the flow of hot and cold water, respectively. Water may be supplied through an inlet conduit 46 directly to the tub 14 by controlling first and second diverter mechanisms 48 and 50, respectively. The diverter mechanisms 48, 50 may be a diverter valve having two outlets such that the diverter mechanisms 48, 50 may selectively direct a flow of liquid to one or both of two flow paths. Water from the household water supply 40 may flow through the inlet conduit 46 to the first diverter mechanism 48 which may direct the flow of liquid to a supply conduit 52. The second diverter mechanism 50 on the supply conduit 52 may direct the flow of liquid to a tub outlet conduit 54 which may be provided with a spray nozzle 56 configured to spray the flow of liquid into the tub 14. In this manner, water from the household water supply 40 may be supplied directly to the tub 14.

The washing machine 10 may also be provided with a dispensing system for dispensing treating chemistry to the treating chamber 18 for use in treating the laundry according to a cycle of operation. The dispensing system may include a dispenser 62 which may be a single use dispenser, a bulk dispenser or a combination of a single use and a bulk dispenser. Non-limiting examples of suitable dispensers are disclosed in U.S. Pat. No. 8,196,441 to Hendrickson et al., filed Jul. 1, 2008, entitled "Household Cleaning Appliance with a Dispensing System Operable Between a Single Use Dispensing System and a Bulk Dispensing System," U.S. Pat. No. 8,388,695 to Hendrickson et al., filed Jul. 1, 2008, entitled "Apparatus and Method for Controlling Laundering Cycle by Sensing Wash Aid Concentration," U.S. Pat. No. 8,397,328 to Hendrickson et al., filed Jul. 1, 2008, entitled "Apparatus and Method for Controlling Concentration of Wash Aid in Wash Liquid," U.S. Pub. No. 2010/0000581 to Doyle et al., filed Jul. 1, 2008, entitled "Water Flow Paths in a Household Cleaning Appliance with Single Use and Bulk Dispensing," U.S. Pub. No. 2010/0000264 to Luckman et al., filed Jul. 1, 2008, entitled "Method for Converting a Household Cleaning Appliance with a Non-Bulk Dispensing System to a Household Cleaning Appliance with a Bulk Dispensing System," U.S. Pat. No. 8,397,544 to Hendrickson, filed Jun. 23, 2009, entitled "Household Cleaning Appliance with a Single Water Flow Path for Both Non-Bulk and Bulk Dispensing," and U.S. Pat. No. 8,438,881 to Ihne et al., filed Apr. 25, 2011, entitled "Method and Apparatus for Dispensing Treating Chemistry in a Laundry Treating Appliance," which are herein incorporated by reference in full.

Regardless of the type of dispenser used, the dispenser 62 may be configured to dispense a treating chemistry directly to the tub 14 or mixed with water from the liquid supply system through a dispensing outlet conduit 64. The dispensing outlet conduit 64 may include a dispensing nozzle 66 configured to dispense the treating chemistry into the tub 14 in a desired pattern and under a desired amount of pressure. For example, the dispensing nozzle 66 may be configured to dispense a flow or stream of treating chemistry into the tub 14 by gravity, i.e. a non-pressurized stream. Water may be supplied to the dispenser 62 from the supply conduit 52 by directing the diverter mechanism 50 to direct the flow of water to a dispensing supply conduit 68.

Non-limiting examples of treating chemistries that may be dispensed by the dispensing system during a cycle of operation include one or more of the following: water, enzymes, fragrances, stiffness/sizing agents, wrinkle releasers/reducers, softeners, antistatic or electrostatic agents, stain repellants, water repellants, energy reduction/extraction aids, antibacterial agents, medicinal agents, vitamins, moisturizers, shrinkage inhibitors, and color fidelity agents, and combinations thereof.

The washing machine 10 may also include a recirculation and drain system for recirculating liquid within the laundry holding system and draining liquid from the washing machine 10. Liquid supplied to the tub 14 through the tub outlet conduit 54 and/or the dispensing supply conduit 68 typically enters a space between the tub 14 and the drum 16 and may flow by gravity to a sump 70 formed in part by a lower portion of the tub 14. The sump 70 may also be formed by a sump conduit 72 that may fluidly couple the lower portion of the tub 14 to a pump 74. The pump 74 may direct liquid to a drain conduit 76, which may drain the liquid from the washing machine 10, or to a recirculation conduit 78, which may terminate at a recirculation inlet 80. The recirculation inlet 80 may direct the liquid from the recirculation conduit 78 into the drum 16. The recirculation inlet 80 may introduce the liquid into the drum 16 in any suitable manner, such as by spraying, dripping, or providing a steady flow of liquid. In this manner, liquid provided to the tub 14, with or without treating chemistry may be recirculated into the treating chamber 18 for treating the laundry within.

The liquid supply and/or recirculation and drain system may be provided with a heating system which may include one or more devices for heating laundry and/or liquid supplied to the tub 14, such as a steam generator 82 and/or a sump heater 84. Liquid from the household water supply 40 may be provided to the steam generator 82 through the inlet conduit 46 by controlling the first diverter mechanism 48 to direct the flow of liquid to a steam supply conduit 86. Steam generated by the steam generator 82 may be supplied to the tub 14 through a steam outlet conduit 87. The steam generator 82 may be any suitable type of steam generator such as a flow through steam generator or a tank-type steam generator. Alternatively, the sump heater 84 may be used to generate steam in place of or in addition to the steam generator 82. In addition or alternatively to generating steam, the steam generator 82 and/or sump heater 84 may be used to heat the laundry and/or liquid within the tub 14 as part of a cycle of operation.

Additionally, the liquid supply and recirculation and drain system may differ from the configuration shown in FIG. 1, such as by inclusion of other valves, conduits, treating chemistry dispensers, sensors, such as water level sensors and temperature sensors, and the like, to control the flow of liquid through the washing machine 10 and for the introduction of more than one type of treating chemistry.

The washing machine 10 also includes a drive system for rotating the drum 16 within the tub 14. The drive system may include a motor 88, which may be directly coupled with the rotatable drum 16 through a drive shaft 90 at or about the rear cover 34 to rotate the drum 16 about a rotational axis during a cycle of operation. The motor 88 may be a brushless permanent magnet (BPM) motor having a stator 92 and a rotor 94. Alternately, the motor 88 may be coupled to the drum 16 through a belt and a drive shaft to rotate the rotatable drum 16, as is known in the art. Other motors, such as an induction motor or a permanent split capacitor (PSC) motor, may also be used. The motor 88 may rotate the drum 16 at various speeds in either rotational direction.

The washing machine 10 also includes a control system for controlling the operation of the washing machine 10 to implement one or more cycles of operation. The control system may include a controller 96 located within the cabinet 12 and a user interface 98 that is operably coupled with the controller 96. The user interface 98 may include one or more knobs, dials, switches, displays, touch screens and the like for communicating with the user, such as to receive input and provide output. The user may enter different types of information including, without limitation, cycle selection and cycle parameters, such as cycle options.

The controller 96 may include the machine controller and any additional controllers provided for controlling any of the components of the washing machine 10. For example, the controller 96 may include the machine controller and a motor controller. Many known types of controllers may be used for the controller 96. The specific type of controller is not germane to the invention. It is contemplated that the controller is a microprocessor-based controller that implements control software and sends/receives one or more electrical signals to/from each of the various working components to effect the control software. As an example, proportional control (P), proportional integral control (PI), and proportional derivative control (PD), or a combination thereof, a proportional integral derivative control (PID control), may be used to control the various components.

Figure 2:
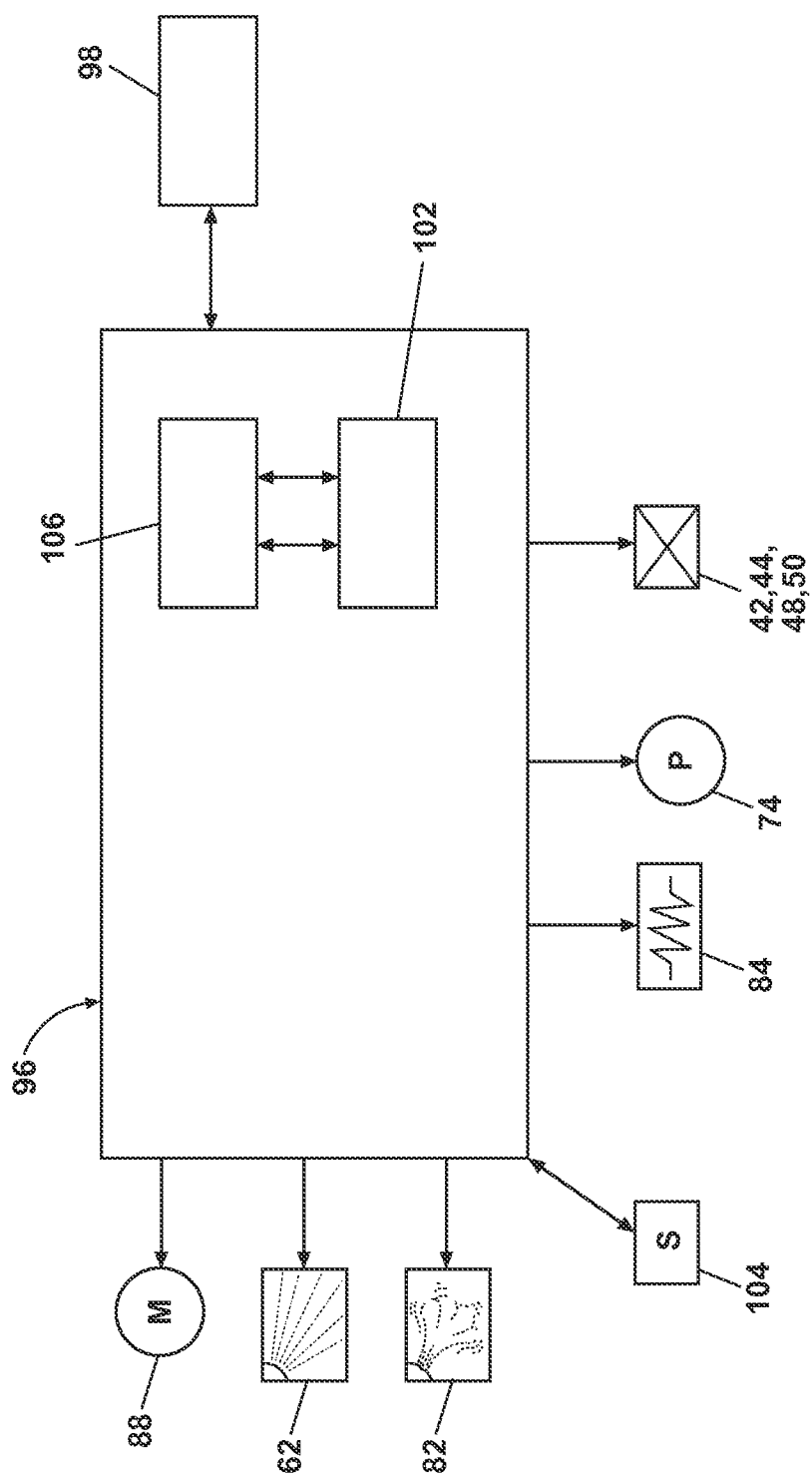
FIG. 2 is a schematic of a control system of the laundry treating appliance of FIG. 1 according to an embodiment of the invention.

As illustrated in FIG. 2, the controller 96 may be provided with a memory 106 and a central processing unit (CPU) 102. The memory 106 may be used for storing the control software that is executed by the CPU 102 in completing a cycle of operation using the washing machine 10 and any additional software. Examples, without limitation, of cycles of operation include: wash, heavy duty wash, delicate wash, quick wash, pre-wash, refresh, rinse only, and timed wash. The memory 106 may also be used to store information, such as a database or table, and to store data received from one or more components of the washing machine 10 that may be communicably coupled with the controller 96. The database or table may be used to store the various operating parameters for the one or more cycles of operation, including factory default values for the operating parameters and any adjustments to them by the control system or by user input.

The controller 96 may be operably coupled with one or more components of the washing machine 10 for communicating with and controlling the operation of the component to complete a cycle of operation. For example, the controller 96 may be operably coupled with the motor 88, the pump 74, the dispenser 62, the steam generator 82 and the sump heater 84 to control the operation of these and other components to implement one or more of the cycles of operation.

The controller 96 may also be coupled with one or more sensors 104 provided in one or more of the systems of the washing machine 10 to receive input from the sensors, which are known in the art and not shown for simplicity. Non-limiting examples of sensors 104 that may be communicably coupled with the controller 96 include: a treating chamber temperature sensor, a moisture sensor, a weight sensor, a chemical sensor, a position sensor and a motor torque sensor, which may be used to determine a variety of system and laundry characteristics, such as laundry load inertia or mass.

The laundry treating appliance 10 may also include an integrated dynamic balancer 100 at the front 17 and/or rear 19 side of the rotatable drum 16 which includes a moveable mass 150 to offset an imbalance that may occur in the treating chamber 18 during rotation of the rotatable drum 16 during a cycle of operation. In FIG. 1 an integrated dynamic balancer 100 is shown at both the front 17 and rear 19 sides of the rotatable drum 16. The term "integrated" is used to describe that the balancer 100 is integrated with the rotatable drum 16, and in the illustrated embodiments, by way of the front cover 30 and/or rear cover 34.

During a cycle of operation in which the drum 16 is rotated, the moveable mass 150 may apply pressure to parts of the balancer 100 as a result of the centrifugal force applied to the moveable mass 150, especially when the moveable mass 150 includes spherical weights, such as steel balls. Metal is generally stiffer than plastic and thus may be less likely to be deformed or damaged as a result of the centrifugal force applied to the moveable mass 150. However, contact between the moveable mass 150 and metal components of the balancer 100 during rotation of the drum 16 may generate undesirable sound. The balancer 100 may be provided with a sound damping component or combination of sound damping components to reduce undesirable sound generated by the balancer 100. As used herein, sound damping refers to reducing undesirable sound by absorption and/or redirection of sound waves.

Figure 3:
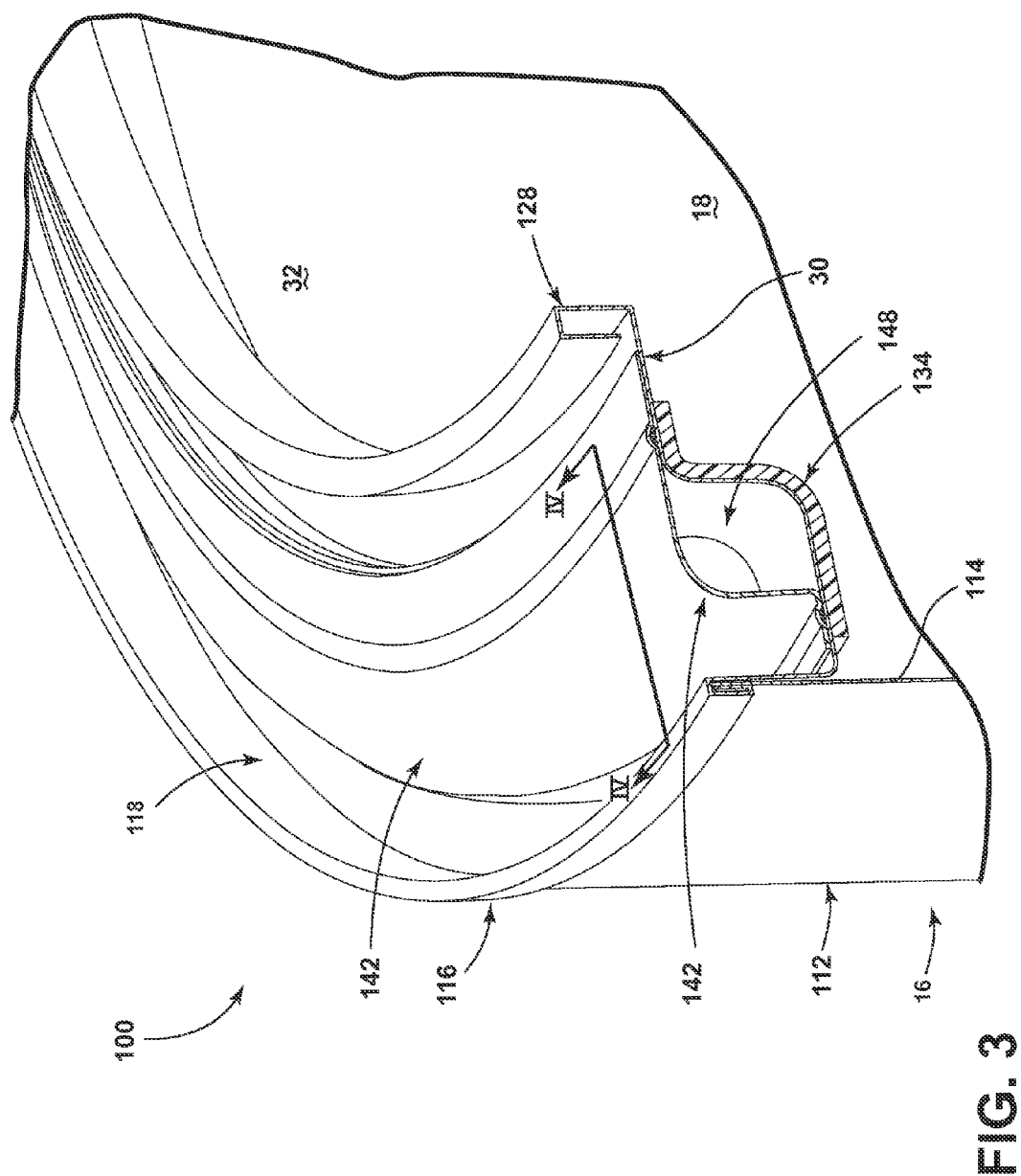
FIG. 3 is an isometric view, partly in cross section, of an integrated dynamic balancer in accordance with an embodiment of the invention.
Figure 4:
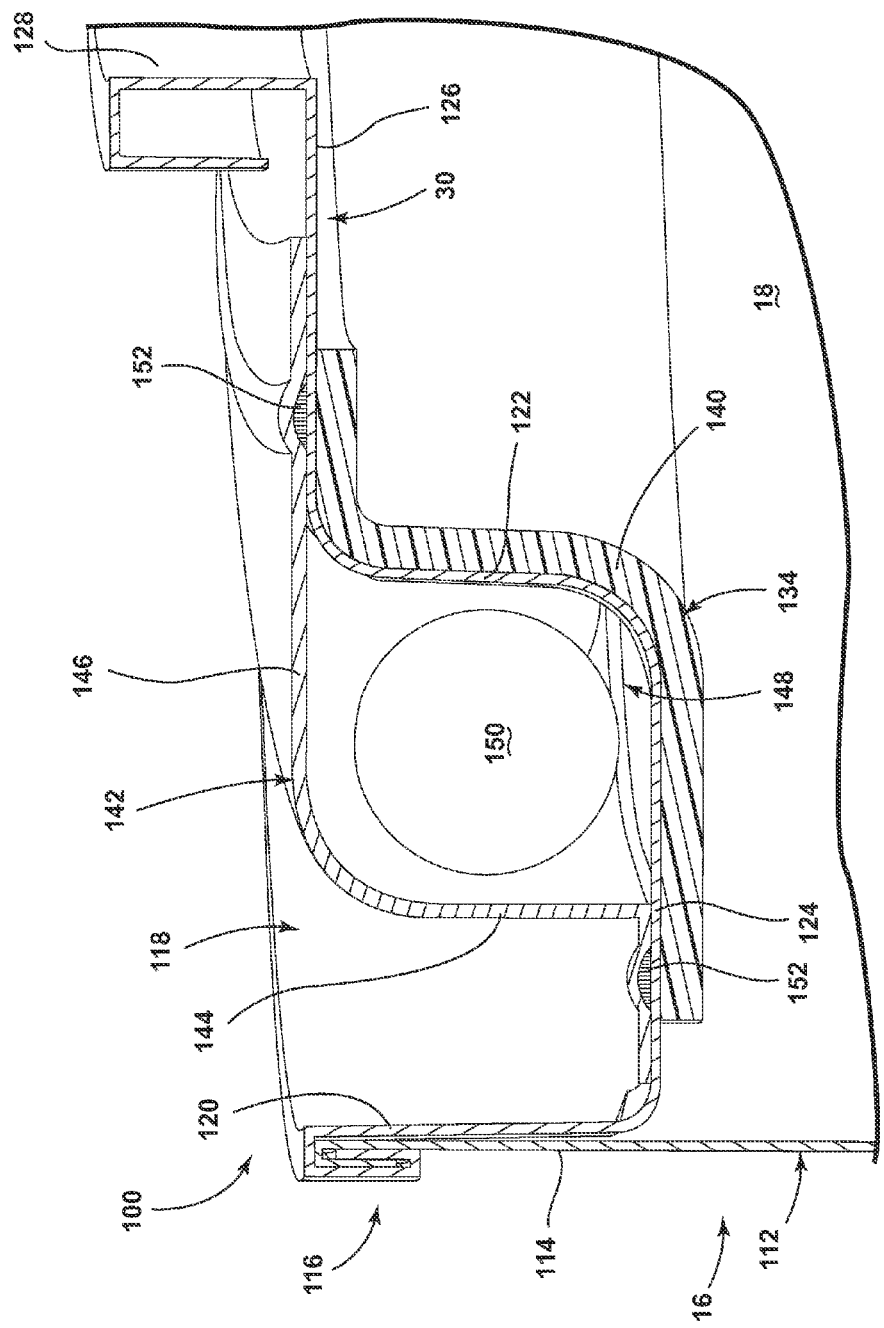
FIG. 4 is a cross section of the integrated dynamic balancer of FIG. 3 taken along lines IV-IV.

FIGS. 3-4 illustrate views of an embodiment of the integrated dynamic balancer 100 in the context of a front cover 30 and its opening 32. Looking again also at FIG. 1, the integrated dynamic balancer 100 is disposed coaxially with the longitudinal axis 21 of the treating chamber 18. The rotatable drum 16 encloses the treating chamber 18 in a cylindrical body 112 defined in part by a cylindrical wall 114 and the front cover 30. The front cover 30 is coupled to the cylindrical wall 114 at a suitable junction 116, which may include any of or any combination of crimping, welding, riveting, fastening, screwing, or the like. The front cover 30 of the drum 16 has an annular groove 118 defined by a first wall 120, a second wall 122 spaced from the first wall 120 and generally parallel thereto, and a third wall 124 extending between the first and second walls. A fourth wall 126 extends from the second wall 122 to an edge 128 that defines the opening 32. At least a portion of the fourth wall 126 extends generally normal to the longitudinal axis 21. In other words, it will be understood that the fourth wall 126 need not be planar and portions thereof may vary in orientation relative to the longitudinal axis 21. The front cover 30 is preferably made of metal, such as stainless steel, as is preferably the cylindrical wall 114.

An adjoining piece 142, formed from metal or a laminated metal material is attached to the third wall 124 and the fourth wall 126 and has at least one adjoining wall that extends between the third wall 124 and the fourth wall 126 to define a hollow annular raceway 148. A movable mass 150 may be disposed in the annular raceway 148 and moveable therein. The adjoining piece 142 may be L-shaped in cross section, defined by a first adjoining wall 144 and a second adjoining wall 146. The first adjoining wall 144 may be attached to the third wall 124 and the second adjoining wall 146 may be attached to the fourth wall 126 by at least one weld 152 to define the hollow annular raceway 148 bounded by the first and second adjoining walls 144, 146, and the second and third walls 122, 124 of the drum cover 30. Preferably the annular raceway 148 is fluid-tight to enable it to contain a fluid without leaking. To this end, seals may be provided to render the space fluid-tight. Exemplary seals may include O-rings, gaskets, or the like. The weld 152 may be any suitable type of weld, non-limiting examples of which include an ultra-sonic welding, high frequency welding, friction welding, laser welding, pressure welding, and/or heat welding.

A support piece 134 may be secured to the front cover 30 of the drum 16 in any suitable manner, non-limiting examples of which include an adhesive, welding, a molding process, or mechanical fastener. The support piece 134 may be secured to an inner side of the front cover 30 such that an insulating layer 140 extends adjacent at least an inner side of the second wall 122 and the third wall 124. Alternatively, the support piece 134 may be secured on an outer side of the adjoining piece 142. The support piece 134 may be made from a polymeric, plastic material and may also dampen vibrations in the drum cover 30 generated by movement of the moveable mass 150 within the annular raceway 148 which may generate undesirable sounds. As such, the support piece 134 may be considered a sound dampener. Note that the "inner side" and "outer side" are relative to the interior and exterior, respectively, of the treating chamber 18, and do not necessarily reflect the actual positioning of the integrated dynamic balancer 100 on a washing machine in which it may be installed during use.

The drum cover 30 and/or the adjoining piece 142 may be made from metal, such as steel or aluminum, or a laminated metal material. Referring now to FIG. 5A, the drum cover 30 and/or the adjoining piece 142 may be at least partially made from a laminated metal material 154 comprising a polymeric layer 155 laminated on one or both sides of a metal layer 156. Alternatively, as illustrated in FIG. 5B, the drum cover 30 and/or the adjoining piece 142 may be made from a metal layer 156 laminated on one or both sides of a polymeric layer 155. While the laminated material 154 is illustrated as being formed from a polymeric or metal layer 155, 156 laminated with a single metal or polymeric layer 156, 155, respectively, it is within the scope of the invention for the laminated material 154 to be formed from multiple layers, which may be the same or different from one another. One or more adhesive layers (not shown) may be provided between the polymeric layer 155 and/or the metal layer 156 to adhere the layers 155, 156 to one or more adjacent layers. The laminated metal material 154 includes at least one metal layer 156 to strengthen the drum cover 30 and/or the adjoining piece 142 and at least one polymeric layer 155 which may act as a sound dampener to decrease undesirable sound that may be generated by movement of the moveable mass 150 within the annular raceway 148.

The support piece 134 and the drum cover 30 and/or the adjoining piece 142 made from the laminated metal material 154 may be combined in any number of combinations to provide the balancer 100 with the desired strength and sound damping properties. For example, the support piece 134 may be combined with a metal drum cover 30 and metal adjoining piece 142, as illustrated in FIG. 4. Alternatively, the support piece 134 may be combined with a drum cover 30 made of metal and an adjoining piece 142 made from a laminated metal material 154. In yet another example, both the drum cover 30 and the adjoining piece 142 may be made from a laminated metal material 154 and used with or without the support piece 134 to form the balancer 100.

FIGS. 6 and 7 illustrate an embodiment in which the support piece 134 is overmolded onto the drum cover 30 and the adjoining piece 142 is secured to the drum cover 30 by a mechanical securement. The front cover 30 may have two ranks of discontinuities, one rank of discontinuities 130 on the fourth wall 126, and a second rank of discontinuities 132 on the third wall 124. Each rank of discontinuities 130, 132 is annular in that it is radially spaced from the longitudinal axis 21. Each rank 130, 132 is preferably offset from the other in that the discontinuities of each rank 130, 132 do not lie on the same radius from the longitudinal axis 21. The discontinuities 130, 132 may be apertures or perforations in the third and fourth walls 124, 126 as shown FIGS. 6-7.

A first land 136 extends annularly on an outer side of the third wall 124 within the annular groove 118. It is secured to the third wall 124, preferably, but not necessarily, at the rank of discontinuities 132 therein, as may best be seen in FIG. 7. A second land 138 extends annularly on an outer side of the fourth wall 126 between the second wall 122 and the edge 128. It is secured to the fourth wall 126, preferably, but not necessarily at the rank of discontinuities 130 therein. The support piece 134 may comprise a moldable material such as a thermoplastic, such that in the molding process, material flows through the ranks of discontinuities 130, 132, which in this case would be apertures or perforations. The molding process produces, integrally, the first land 136 extending annularly on an outer side of the third wall 124 within the annular groove 118, and the second land 138 extending annularly on an outer side of the fourth wall 126 between the second wall 122 and the edge 128. In this manner, the support piece 134 may be overmolded onto the drum cover 30. The support piece 134 may be overmolded onto the adjoining piece 142 in a similar manner.

Still referring to FIGS. 6 and 7, the adjoining piece 142 may be secured to the first and second lands 136, 138 by mechanical fasteners 190. The first adjoining wall 144 may include a flange 192 extending from the first adjoining wall 144 and including apertures 194 through which the fasteners 190 extend. Similarly, the second adjoining wall 146 includes a flange 196 having apertures 198 through which the fasteners 190 extend. The fasteners 190 may be in the form of posts, bosses, screws, bolts, rivets and the like and may be secured to the first and second lands 136, 138 by mechanical attachment, adhesion, and/or welding. Alternatively, or additionally, the support piece 134 may be overmolded onto the adjoining piece 142 and the first and second lands 136, 138 may be secured to the drum cover 30 by the mechanical fasteners 190. A first chamfer 198 may optionally be disposed on the first land 136 between the first adjoining wall 144 of the balancer 100 and the third wall 124 to provide a surface there between against which the mass 150 may move.

The mass 150 movable along the annular raceway 148 may include a fluid, such as water, salt water, oil or other viscous fluid, for example, and optionally one or more moveable weights, such as spherical balls. The mass 150 may partially fill the annular raceway 148 and may distribute or collect unevenly to offset an unbalanced condition in the rotatable drum 16.

FIG. 8 illustrates another embodiment of an integrated dynamic balancer 200 which is similar to the integrated dynamic balancer 100 except for the manner in which the adjoining piece 142 is secured to the cover 30 and the configuration of the support piece 234. Therefore, elements of the integrated dynamic balancer 200 that differ from those of the integrated dynamic balancer 100 are labeled with the prefix 200.

The adjoining piece 142 may be secured to the drum cover 30 to define the hollow annular raceway 148 bound by the first adjoining wall 144, the second adjoining wall 146, the second wall 122 and the third wall 124. The adjoining piece 142 may include a first flange 300 extending from the first adjoining wall 144 and a second flange 302 extending from the second adjoining wall 146. The first and second flanges 300, 302 may each be provided with a gasket 310 disposed between the first and second flanges 300, 302 and the third and fourth walls 124, 126, respectively. The gasket 310 may be made from a compressible foam, such as a polyethylene based foam or an ethylene propylene diene monomer (EPDM) based foam, such as a closed cell EPDM foam, for example. In an exemplary embodiment, the gasket 310 may be coupled with the first and second flanges 300, 302, using an adhesive or other suitable fastener. In yet another alternative, the gasket 310 may be provided on the third and fourth walls 124, 126 and the adjoining piece 142 may be provided on the gaskets 310.

The adjoining piece 142 may be secured to the drum cover 30 through the first and second flanges 300, 302 by a plurality of fasteners 304. The front cover 30 may include apertures forming the ranks of discontinuities through which the fasteners 304 extend. In one example, the front cover 30 may include apertures 306 in the third wall 124 forming the first rank of discontinuities (shown) and a second set of apertures in the fourth wall 126 (not shown) forming the second rank of discontinuities. The fasteners 304 may extend through the first and second flanges 300, 302, through the gaskets 310, through the drum cover 30 and optionally into the support piece 234 provide on the inner side of the cover 30. In this manner, the first adjoining wall 144, second adjoining wall 146, second wall 122 and third wall 124 form the annular raceway 148 through which the moveable mass 150 may move. The gaskets 310 facilitate forming a seal between the first flange 300 and the third wall 124 and between the second flange 302 and the fourth wall 126 such that the annular raceway 148 is fluid-tight.

The support piece 234 may be provided on the inner side of the drum cover 30 and may include the insulating layer 240 extending between first and second support piece flanges 312, 314. The insulating layer 240 may be offset from the first and second support piece flanges 312, 314 to provide an insulating space 316 between the second and third walls 122, 124 and the insulating layer 240. The support piece 234 may be coupled with the drum cover 30 through the same fasteners 304 used to secure the adjoining piece 142 to the drum cover 30. Alternatively, the support piece 234 may be coupled with the drum cover 30 separate from the adjoining piece 234, such as by an adhesive, weld or molding process, for example. Additionally, or alternatively, the positioning of the support piece 234 may be reversed and the support piece 234 may be provided on the outer side of the adjoining piece 142.

It will be understood that more than one integrated dynamic balancer 100, 200 may be disposed in a laundry treating device. For example, in a horizontal axis washing machine, there may be a dynamic balancer device 100, 200 at both the front and rear sides 17, 19 of the rotatable drum 16. It will be further understood that the integration of the balancer 100 with the drum 16 may include placing the lands 136, 138 anywhere on the covers 30, 34 or on the cylindrical wall 114. As well, the covers 30, 34 may or may not have an annular groove 118. Moreover, the adjoining piece 142 may be attached directly to the drum 16 by way of the cylindrical wall 114 and/or the covers 30, 34 with or without the ranks of discontinuities 130, 132 or the lands 136, 138.

During assembly, the moveable mass 150 may be provided against one of the second and/or third walls 122, 124 and the adjoining piece 142, 242 of the integrated dynamic balancer 100, 200, respectively, may then be coupled with the drum cover 30 to secure the moveable mass 150 therein. Alternatively, or additionally, the adjoining piece 142, 242 may be coupled with the drum cover 30 prior to adding the moveable mass to the annular raceway 148 therein. In one example, the moveable mass 150 may include a plurality of balls that may be provided against the second and/or third walls 122, 124 prior to coupling the adjoining piece 142, 242 with the drum cover 30. The balancer 100, 200 may optionally be provided with a port to provide access to the annular raceway 148. A fluid, such as oil, may be added to the annular raceway 148 through the port after the adjoining piece 142, 242 is coupled with the drum cover 30. In another example, the adjoining piece 142, 242 may be coupled with the cover 30 to define the annular raceway 148 and the moveable mass, either balls, fluid, or a combination of balls and fluid may be added to the annular raceway 148 through appropriate sized port(s) provided in the balancer 100, 200.

The integrated dynamic balancers 100, 200 described herein combine a metal drum cover 30 and an adjoining piece 142, 242 with a sound dampener to reduce undesirable sounds that may be generated within the balancers 100, 200 by the moveable mass 150. As discussed above, during a cycle of operation in which the drum 16 is rotated, the components of the balancers 100, 200 may experience centrifugal forces acting upon them by the moveable mass 150 therein, especially when the drum 16 is rotated at high speeds. When the moveable mass 150 is in the form of a metal ball, contact between the balls and plastic forming the annular raceway 148 may deform or damage the plastic and may inhibit free rolling motion of the balls over time. While forming the components of the balancer 100, 200 from metal, which is generally stiffer than plastic, may decrease the likelihood of deformation or damage of the raceway over time, movement of metal balls against a metal surface may generate undesirable noise.

The integrated dynamic balancers 100, 200 described herein form two of the walls of the annular raceway 148 from the groove in the metal drum cover 30 to take advantage of the increased stiffness of metal compared to plastic and provide a metal adjoining piece 142, 242 to form the remaining two walls of the annular raceway 148. One or more sound dampeners may then be combined with the drum cover 30 and/or the adjoining pieces 142, 242 to dampen undesirable noise generated by the motion of the metal balls against the metal walls of the annular raceway 148. For example, one or both of the drum cover 30 and/or adjoining pieces 142, 242 forming the annular raceway 148 may be made from the laminated metal material 154. The laminated metal material 154 may combine the strength of metal with the sound damping properties of plastic. The plastic layer(s) of the laminate 154 may dampen the sound by absorbing and/or redirecting sound waves generated by contact of the moveable mass 150 with the metal layer(s) of the laminate 154. Additionally, or alternatively, the plastic layer(s) of the laminate 154 may insulate the metal layer such that the moveable mass 150 does not come into direct contact with the metal layer of the laminate 154.

The sound dampener may also be in the form of a support piece 134, 234 which may be used alone or in combination with the laminated material 154. The support piece 134, 234 includes an insulating layer 140, 240 made from plastic which may be provided on an inner side of the drum cover 30, adjacent the second wall 122 and the third wall 124, to dampen sound generated by the movement of balls within the annular raceway 158. As illustrated in the context of the balancer 200 of FIG. 8, an insulating space 316 may also be provided between the insulating layer 240 and the drum cover 30 to provide additional sound damping properties.

To the extent not already described, the different features and structures of the various embodiments may be used in combination with each other as desired. That one feature may not be illustrated in all of the embodiments is not meant to be construed that it cannot be, but is done for brevity of description. Thus, the various features of the different embodiments may be mixed and matched as desired to form new embodiments, whether or not the new embodiments are expressly disclosed.

While the invention has been specifically described in connection with certain specific embodiments thereof, it is to be understood that this is by way of illustration and not of limitation. Reasonable variation and modification are possible within the scope of the forgoing disclosure and drawings without departing from the spirit of the invention which is defined in the appended claims.

What is claimed is:

1. A laundry treating appliance with an integrated dynamic balancer comprising:
   a rotatable drum for receiving a laundry load wherein the rotatable drum includes a cylindrical body with a cylindrical wall about a longitudinal axis, and a metal cover at one end thereof, the metal cover having an annular groove formed by a first wall adjacent to the cylindrical wall, a second wall spaced from the first wall, a third wall extending between the first and second walls, and a fourth wall having at least a portion thereof extending from the second wall generally normal to the longitudinal axis;
   a metal adjoining piece having a first adjoining wall coupled with the third wall and a second adjoining wall coupled with the fourth wall;
   wherein a hollow annular raceway is defined by the second wall, the third wall, the first adjoining wall, and the second adjoining wall;
   a sound dampener comprising at least one of a polymeric layer in the metal cover, a polymeric layer in the metal adjoining piece or an insulating layer in a support piece adjacent at least one of the walls; and
   a mass disposed in the hollow annular raceway and movable therein.

2. The integrated dynamic balancer of claim 1 wherein the metal is one of steel or aluminum.

3. The integrated dynamic balancer of claim 1 wherein the polymeric layer is laminated with metal in one of the metal cover or the metal adjoining piece.

4. The integrated dynamic balancer of claim 1 wherein the first and second adjoining walls each comprise at least one flange for coupling with the metal cover.

5. The integrated dynamic balancer of claim 1 wherein the first and second adjoining walls are coupled to the metal cover by at least one of a weld, a mechanical fastener, an adhesive or any combination thereof.

6. The integrated dynamic balancer of claim 1 wherein the sound dampener comprises a non-metallic material overmolded onto at least a portion of one of the metal cover or the metal adjoining piece.

7. The integrated dynamic balancer of claim 1 wherein the mass includes at least one of balls, viscous fluid, or water.

8. The integrated dynamic balancer of claim 1 wherein the sound dampener extends adjacent at least an inner side, relative to the interior of the treating chamber, of the second wall and the third wall.

9. The integrated dynamic balancer of claim 1 wherein the sound dampener extends adjacent at least the full length of at least one of the walls defining the hollow annular raceway.

* * * * *